(12) United States Patent
Ganey et al.

(10) Patent No.: US 9,542,097 B2
(45) Date of Patent: Jan. 10, 2017

(54) VIRTUAL TOUCHPAD FOR A TOUCH DEVICE

(75) Inventors: Harriss C. Ganey, Cary, NC (US); Jay W. Johnson, Raleigh, NC (US); Howard J. Locker, Cary, NC (US); Aaron M. Stewart, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 137 days.

(21) Appl. No.: 12/686,823

(22) Filed: Jan. 13, 2010

(65) Prior Publication Data

US 2011/0169749 A1 Jul. 14, 2011

(51) Int. Cl.
 *G06F 3/0488* (2013.01)
 *G06F 1/16* (2006.01)
 *G06F 3/041* (2006.01)

(52) U.S. Cl.
 CPC ......... *G06F 3/04886* (2013.01); *G06F 1/1626* (2013.01); *G06F 3/0416* (2013.01)

(58) Field of Classification Search
 USPC ........................................ 345/173
 See application file for complete search history.

(56) References Cited

U.S. PATENT DOCUMENTS

| | | | |
|---|---|---|---|
| 2003/0193481 A1* | 10/2003 | Sokolsky | 345/173 |
| 2004/0021681 A1 | 2/2004 | Liao | |
| 2006/0007178 A1* | 1/2006 | Davis | 345/173 |
| 2006/0026521 A1* | 2/2006 | Hotelling | G06F 3/0418 715/702 |
| 2006/0161870 A1* | 7/2006 | Hotelling et al. | 715/863 |
| 2006/0178827 A1* | 8/2006 | Aoyama | 701/211 |
| 2009/0213081 A1* | 8/2009 | Case, Jr. | 345/173 |
| 2009/0275406 A1* | 11/2009 | Bytnar et al. | 463/30 |
| 2009/0289958 A1* | 11/2009 | Kim et al. | 345/649 |
| 2009/0322687 A1* | 12/2009 | Duncan et al. | 345/173 |
| 2010/0103136 A1* | 4/2010 | Ono | G06F 3/0488 345/173 |
| 2011/0047459 A1* | 2/2011 | Van Der Westhuizen | 715/702 |

FOREIGN PATENT DOCUMENTS

WO 2009049331 A2 4/2009

* cited by examiner

*Primary Examiner* — Amare Mengistu
*Assistant Examiner* — Sarvesh J Nadkarni
(74) *Attorney, Agent, or Firm* — Kunzler Law Group

(57) ABSTRACT

An apparatus, method, and computer program product are disclosed to provide a virtual touchpad for a touch device. A placement module places a virtual touchpad at a dynamic location within a touch sensitive area of a touch device. A touch input module positions a pointer on a screen of the touch device in response to a touch input on the virtual touchpad.

14 Claims, 6 Drawing Sheets

VIRTUAL TOUCHPAD FOR A TOUCH DEVICE

BACKGROUND

Field

The subject matter disclosed herein relates to input devices and more particularly relates to virtual input devices for a touch device.

Description of the Related Art

Input devices allow users to interact with a computer system. Input devices such as computer mice, touchpads, joysticks, trackballs, and touchscreens allow users to navigate a graphical user interface ("GUI") by translating a user's movement to a pointer or cursor on a screen. These hardware input devices, however, typically have a fixed position relative to the computer system, especially in portable devices. Hardware input devices also have fixed shapes and sizes.

Because of their fixed positions, shapes, and sizes, hardware input devices are often difficult or impossible to customize. For this reason, input devices that are optimized for right-handed users can be awkward for left-handed users and vice versa. Input devices that are not optimized for right-handed users or left-handed users can be awkward for both groups. Input devices that are not optimized for a specific user and that are not customizable can require the user to use both hands simultaneously to use the input device, for example by holding a computing device in one hand and manipulating an input device with the other hand.

Additionally, hardware input devices take up extra physical space on a computing device, whether or not the hardware input device is currently in use. This can increase the size of the computing device. An increased size can negatively influence a computing device's portability, ergonomics, convenience, and cost, especially for portable devices.

SUMMARY

From the foregoing discussion, there is a need for an apparatus, method, and computer program product that provide a dynamic, customizable, virtual input device for a user. Beneficially, such an apparatus, method, and computer program product would facilitate single-handed use of a handheld computing device.

The embodiments of the present invention have been developed in response to the present state of the art, and in particular, in response to the problems and needs in the art that have not yet been fully solved by currently available input devices. Accordingly, the embodiments have been developed to provide an apparatus, method, and computer program product to provide a virtual touchpad for a touch device that overcome many or all of the above-discussed shortcomings in the art.

An apparatus to provide a virtual touchpad for a touch device is provided with a plurality of modules configured to functionally execute the steps of the method. The modules, in one embodiment, include an initiation module, a location module, a placement module, a touch input module, a close module, a visualization module, a relocation module, a gain module, and an appearance module.

In one embodiment, the initiation module receives a virtual touchpad request from a user. The virtual touchpad request, in a further embodiment, is requesting use of a virtual touchpad as an input interface for a touch device. In another embodiment, the virtual touchpad request comprises a touch gesture that the user performs on a screen of the touch device. The virtual touchpad request, in a further embodiment, is a dragging gesture from the periphery of the screen.

In one embodiment, the touch device includes a screen and a touch sensitive area. In a further embodiment, the screen of the touch device is a touchscreen and the touch sensitive area is on the screen. In another embodiment, the touch device is a slate-sized touch device. A slate-sized touch device, in one embodiment, is capable of being held in a single hand of the user and receiving touch input on a screen of the touch device from a thumb of the single hand of the user. The screen, in one embodiment, has a size that is larger than a reaching distance of the thumb and the location of the virtual touchpad is disposed on the screen of the touch device within the reaching distance of the thumb.

In one embodiment, the location module detects a spatial relationship between the touch device and the user. The spatial relationship, in one embodiment, includes a location within the touch sensitive area where the location module detects a predefined touch gesture. In a further embodiment, the spatial relationship includes a location within the touch sensitive area where the location module detects use of a thumb of the user for touch input. In another embodiment, the spatial relationship includes an orientation of the touch device. In one embodiment, the location module selects a dynamic location for the virtual touchpad based on the spatial relationship.

In one embodiment, the placement module places the virtual touchpad at a dynamic location within a touch sensitive area of the touch device. In another embodiment, the location module selects the dynamic location for the placement module based on the spatial relationship that the location module detects. The placement module, in a further embodiment, overlays the virtual touchpad over a currently displayed area of a screen of the touch device. In another embodiment, the placement module resizes a display area of a screen of the touch device away from the location of the virtual touchpad such that the display area and the touchpad area are separate from each other.

In one embodiment, the touch input module positions a pointer on a screen of the touch device in response to a touch input on the virtual touchpad. The touch input module, in a further embodiment, processes the touch input within the touchpad area as an input interface for the touch device.

In one embodiment, the close module removes the virtual touchpad from the location in response to a close event. The close event, in one embodiment, may be a timeout period passing, input from the user, or a touch gesture performed by the user. The close module, in a further embodiment, removes the virtual touchpad from the location by collapsing the virtual touchpad to a periphery of a screen of the touch device.

In one embodiment, the visualization module displays a scaled visualization of at least a portion of a screen of the touch device on the virtual touchpad. The portion of the screen, in one embodiment, corresponds to an area for which the virtual touchpad receives input. In a further embodiment, the portion of the screen is variable and changes based on the area for which the virtual touchpad receives input.

In one embodiment, the relocation module moves the location for the virtual touchpad dynamically to a different location within the touch sensitive area in response to an event. The event, in one embodiment, is input from the user, a change in orientation of the touch device, or a detected change in the spatial relationship between the touch device and the user.

In one embodiment, the gain module scales movement of the pointer relative to the touch input on the virtual touchpad. In another embodiment, the gain module scales the movement of the pointer based on a size ratio between the virtual touchpad and at least a portion of a screen of the touch device. In a further embodiment, the gain module scales the touch input based on a stored user preference. The virtual touchpad, in one embodiment, comprises a subset of the touch sensitive area of the touch device.

In one embodiment, the appearance module determines a visual appearance of the virtual touchpad based on stored preferences of the user. The appearance module, in a further embodiment, determines one or more of a size, a visual transparency, and a color for the virtual touchpad.

A method is presented to provide a virtual touchpad for a touch device. In one embodiment, the method includes placing the virtual touchpad at a dynamic location within a touch sensitive area of the touch device. In a further embodiment, the method includes positioning a pointer on a screen of the touch device in response to a touch input on the virtual touchpad.

The method, in one embodiment, includes detecting a spatial relationship between a user and the touch device, the dynamic location selected based on the spatial relationship. In another embodiment, the method includes moving the virtual touchpad dynamically to a different location within the touch sensitive area in response to a detected change in a spatial relationship between the touch device and a user. In a further embodiment, the method includes displaying a scaled copy of at least a portion of a screen of the touch device on the virtual touchpad. In one embodiment, the method includes resizing a display area of the screen away from the location of the virtual touchpad such that the virtual touchpad is separate from the display area and the screen is a touchscreen.

A computer program product is also presented to provide a virtual touchpad for a touch device. The computer program product comprises a computer readable storage medium storing computer usable program code executable on a computer to perform operations.

The operations, in one embodiment, include placing a virtual touchpad at a dynamic location within a touch sensitive area of a touch device. In a further embodiment, the operations include positioning a pointer on a screen of the touch device in response to a touch input on the virtual touchpad. The operations, in another embodiment, include detecting a spatial relationship between a user and the touch device, the dynamic location selected based on the spatial relationship. In a further embodiment, the operations include moving the virtual touchpad dynamically to a different location within the touch sensitive area in response to a detected change in a spatial relationship between the touch device and a user.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
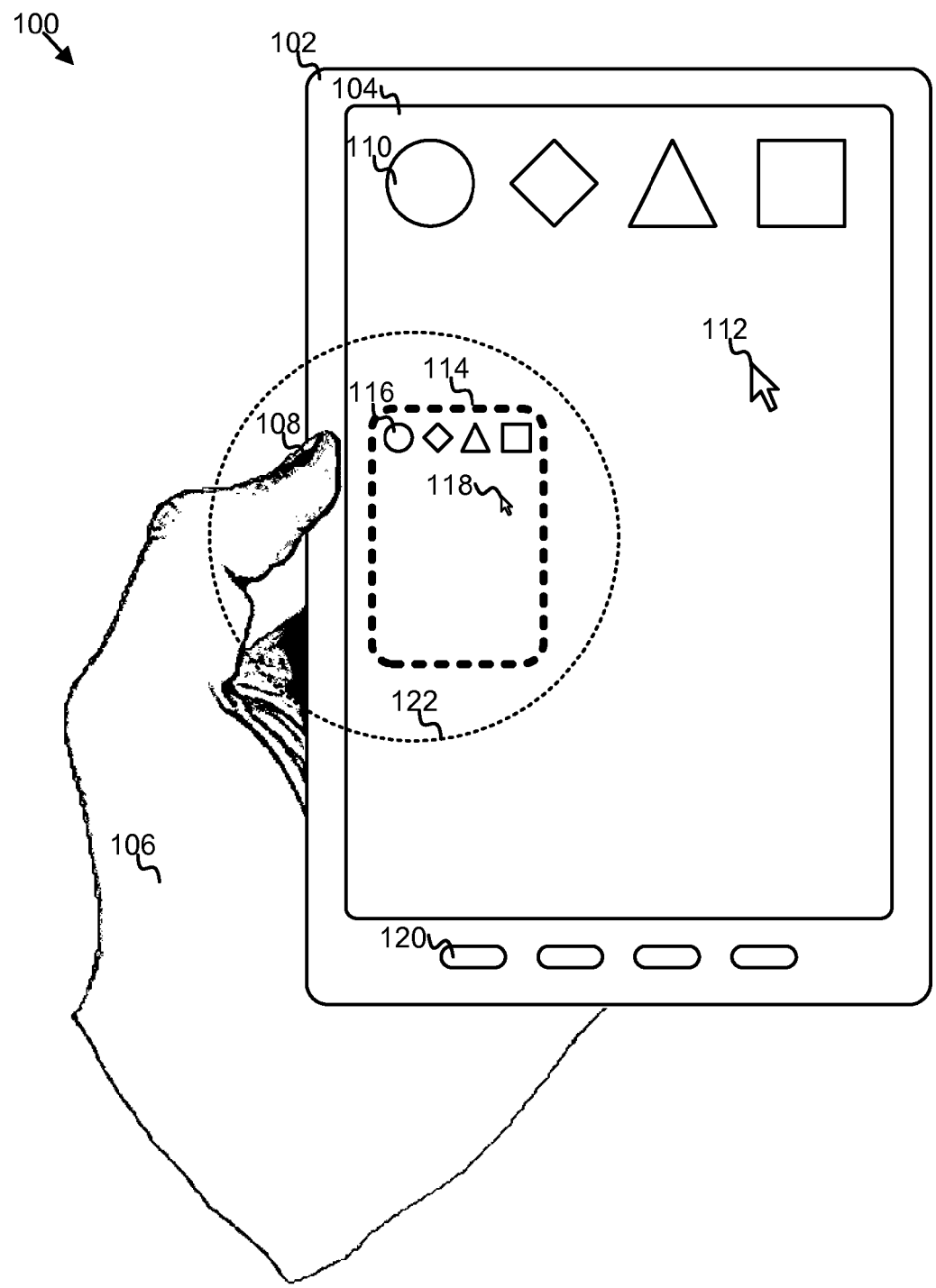
FIG. 1 is a schematic block diagram illustrating one embodiment of a system to provide a virtual touchpad for a touch device.

FIG. 1 depicts one embodiment of a system 100 to provide a virtual touchpad 114 for a touch device 102. In the depicted embodiment, the system 100 includes a touch device 102, a screen 104, one or more graphical elements 110, a pointer 112, a virtual touchpad 114, one or more scaled graphical elements 116, a scaled pointer 118, and one or more hardware inputs 120.

The touch device 102, in the depicted embodiment, is held in a single hand 106 of a user such that the screen 104 receives touch input from the user as a thumb 108 of the user touches the screen 104. By providing the virtual touchpad 114, the system 100 can accommodate both right-handed and left-handed users and both portrait and landscape orientations of the touch device 102 without increasing the size of the touch device 102. For example, in one embodiment, the system 100 dynamically places the virtual touchpad 114 at an optimal location on the screen 104 as a user changes their use of the touch device 102, switching from right-handed use to left-handed use, rotating the touch device 102 from a portrait orientation to a landscape orientation, or the like. The system 100, in one embodiment, can remove the virtual touchpad 114 from the screen 104 when not in use, optimizing use of the screen 104.

In the depicted embodiment, the touch device 102 is a computing device that displays visual images for a user on a screen 104 and receives touch input from a user on the screen 104 and/or on a separate touch sensitive area, such as a bezel of the screen 104, or the like. The touch device 102, in one embodiment, includes logic hardware elements and one or more computer readable storage media. For example, in various embodiments, the touch device 102 may include one or more microprocessors, volatile and nonvolatile memory devices, electronic inputs and outputs, wireless and wired networking components, and the like.

In the depicted embodiment, the touch device 102 is a slate-sized touch device that is capable of being held in a single hand 106 of a user. The touch device 102, in one embodiment, may be used with a single hand 106. For example, a user may provide touch input to the touch device 102 using a thumb 108 of the single hand 106 as the user holds the touch device 102 in the same hand 106. In further embodiments, the touch device 102 may be a telephone device, a multimedia device, a gaming device, a Global Positioning System ("GPS") unit, a touchscreen computer monitor, an all-in-one touchscreen computing device, a touchscreen laptop, a tablet computer, or another type of touch device.

In the depicted embodiment, the screen 104 is a touch sensitive area on the touch device 102 that receives touch input for the touch device 102 and displays visual images. For example, in one embodiment, the screen 104 may display a Graphical User Interface ("GUI") such as a desktop environment or the like. The screen 104, in one embodiment, includes a liquid crystal display ("LCD"), a light emitting diode ("LED") display, a plasma display, an organic LED ("OLED") display, a surface-conduction electron-emitter display ("SED"), an electronic paper display, a cathode ray tube ("CRT") display, a laser display, a projection display, or the like.

In a further embodiment, the screen 104 displays visual images for the touch device 102 and another touch sensitive area on the touch device 102 receives touch input for the touch device 102, such as an area on a bezel around the screen 104, a touch area disposed below, above, or to a side of the screen 104, or the like. In another embodiment, the screen 104 is a secondary display that receives touch input for the touch device 102 and displays visual images in coordination with a primary screen on the touch device 102 that may or may not be touch sensitive.

The screen 104 and/or other touch sensitive areas of the touch device 102 that receive touch input may detect the touch input using one or more sensors such as resistive, capacitive, surface acoustic wave, surface capacitance, projected capacitance, infrared, strain gauge, optical, dispersive signal, acoustic, or other touchscreen sensors. The screen 104 or other touch sensitive area, in certain embodiments, may detect various forms of touch, such as from a finger or a hand, or from a passive object such as a stylus or pen.

In one embodiment, the screen 104 has a size that is large than a reaching distance 122 of the thumb 108, such that a user is unable to reach an entire area of the screen 104 with the thumb 108 while holding the touch device 102 in a single hand 106. In other embodiments, the screen 104 may be on a computer monitor or other device and may be sized much larger than the reaching distance 122 of the thumb 108, or the screen 104 may be on a mobile device and may be sized similarly to or smaller than the reaching distance 122 of the thumb 108.

In the depicted embodiment, the screen 104 displays the one or more graphical elements 110. The one or more graphical elements 110 may include icons, widgets, buttons, menus, files, folders, images, links, or the like that the screen 104 displays. In one embodiment, a user may interact with the one or more graphical elements 110 with touch input. For example, in various environments, a user may select, execute, highlight, initiate, open, view, or otherwise interact with the one or more graphical elements 110 using touch input.

In the depicted embodiment, the pointer 112 assists the user in interacting with the one or more graphical elements 110. In one embodiment, the screen 104 visually displays the pointer 112. In a further embodiment, the pointer 112 may not be displayed, but may be a logical construct representing a location on the screen 104 indicated by a user. In one embodiment, the pointer 112 may be graphically represented by an arrow, a vertical line or cursor, or another pointer-type icon.

In the depicted embodiment, the screen 104 displays the virtual touchpad 114. In a further embodiment, the virtual touchpad 114 may be placed on a touch sensitive area other than the screen 104. The virtual touchpad 114, in one embodiment, defines a touchpad area on the screen 104 or another touch sensitive area that receives touch input from a user to allow the user to interact with the pointer 112, the one or more graphical elements 110, and/or other items on the screen 104. The virtual touchpad 114 may scale or amplify touch input from a user such that a user may move the pointer 112 to interact with the entire screen 104 while touching only an area defined by the virtual touchpad 114. In one embodiment, the virtual touchpad 114 is disposed on the screen 104 within the reaching distance 122 of the thumb 108, such that a user can reach the entire virtual touchpad 114 with the thumb 108 of the single hand 106 while holding the touch device 102 in the single hand 106.

The touch device 102, in one embodiment, includes a virtual touchpad module that controls the virtual touchpad 114. The virtual touchpad module is described in greater detail with regard to FIGS. 2 and 3. In general, the virtual touchpad module receives a virtual touchpad request from a user, selects a dynamic location for the virtual touchpad 114 relative to the touch device 102, places the virtual touchpad 114 at the dynamic location, positions the pointer 112 on the screen 104 in response to a touch input on the virtual touchpad 114, and removes the virtual touchpad 114 from the location in response to a close event. The location, in one embodiment, is a location on a touch sensitive area of the screen 104 and/or the touch device 102. In one embodiment, the touch device 102 selects the location of the virtual touchpad 114 based on a spatial relationship between a user and the touch device 102, for example a location of a user's thumb 108, a location of a predefined touch gesture from a user, a location of the most recent touch input from a user, or the like.

In the depicted embodiment, the virtual touchpad 114 displays a scaled copy of the screen 104 including the one or more scaled graphical elements 116 and the scaled pointer 118. In a further embodiment, the virtual touchpad 114 may display a scaled copy or visualization of a portion of the screen 104, with a portion of the one or more scaled graphical elements 116 and/or the scaled pointer 118. The one or more scaled graphical elements 116, in one embodiment, correspond to the one or more graphical elements 110 and the scaled pointer 118 corresponds to the pointer 112. By displaying a scaled version of the screen 104 or a portion of the screen 104, the virtual touchpad 114 assists the user in navigating and interacting with the screen 104.

In the depicted embodiment, the touch device 102 includes the one or more hardware inputs 120. The one or more hardware inputs 120, in one embodiment, are auxiliary inputs to the touch sensitive area of the touch device 102. In a further embodiment, the touch device 102 may not include the one or more hardware inputs 120. The hardware inputs 120, in one embodiment, may include buttons, keys, dials, knobs, rockers, switches, and/or other types of hardware inputs.

In one embodiment, a hardware input 120 receives a request from a user for use of the virtual touchpad 114. For example, a user may press, rotate, slide, or otherwise interact with a specific hardware input 210 to request use of the virtual touchpad 114 from the touch device 102. In a further embodiment, a user may request use of the virtual touchpad 114 using a touch sensitive area of the screen 104 and/or the touch device 102. User requests for use of the virtual touchpad are described in greater detail with regard to FIGS. 2 and 3.

Figure 2:
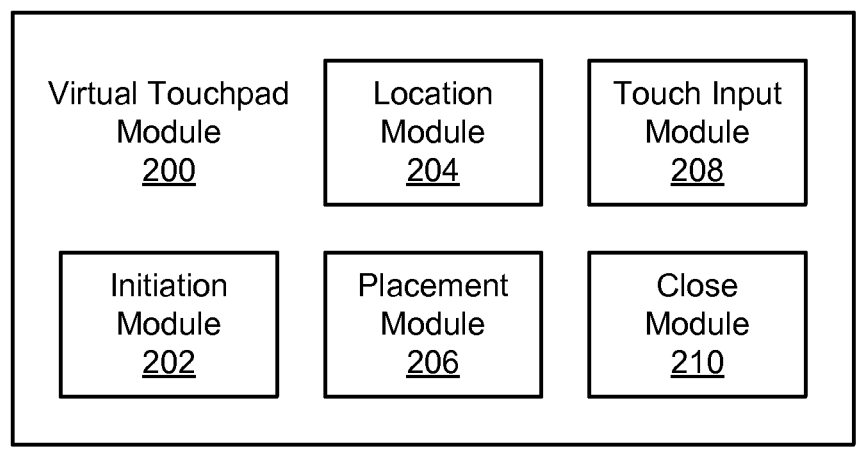
FIG. 2 is a schematic block diagram illustrating one embodiment of a virtual touchpad module.

FIG. 2 depicts one embodiment of a virtual touchpad module 200. In one embodiment, the virtual touchpad module 200 manages the virtual touchpad 114 for the touch device 102. In the depicted embodiment, the virtual touchpad module 200 includes an initiation module 202, a location module 204, a placement module 206, a touch input module 208, and a close module 210.

In one embodiment, the initiation module 202 receives a virtual touchpad request from a user requesting use of the virtual touchpad 114 as an input interface for the touch device 102. The virtual touchpad request, in one embodiment, may be a predefined touch gesture that the user performs on a touch sensitive area of the screen 104 and/or another area of the touch device 102. For example, a touch gesture may include a predefined pattern, shape, motion, or the like that the user performs. A specific area or location, in another embodiment, may be allocated for a touch gesture indicating a virtual touchpad request.

In one embodiment, for example, a user may make a virtual touchpad request by swiping from an edge of the screen 104 toward the center of the screen 104. In a further embodiment, the virtual touchpad request may include an input by a user using one of the hardware inputs 120, a voice command from a user, a predefined accelerometer input, or another type of input from a user. In a further embodiment, the initiation module 202 may recognize use of the thumb 108 as a virtual touchpad request from the user. For example, in one embodiment, the initiation module 202 may differentiate between the size of the thumb 108 and other fingers such that a user may request use of the virtual touchpad 114 by touching the screen 104 or another touch sensitive area with the thumb 108.

In one embodiment, the location module 204 selects a location for the virtual touchpad 114 relative to the touch device 102. The location module 204 may select the location in response to the initiation module 202 receiving the virtual touchpad request. In a further embodiment, the location module 204 detects a spatial relationship between a user and the touch device 102. The location that the location module 204 selects, in one embodiment, is based on a detected spatial relationship between the touch device 102 and the user. The spatial relationship may include a location of the hand 106 and/or the thumb 108 relative to the touch device 102, an orientation of the touch device 102, a location of touch input, a location of a specific touch gesture, or the like.

In one embodiment, the virtual touchpad request includes a touch gesture that the user performs and the spatial relationship between the touch device 102 and the user is based on a location where the user performs the touch gesture. In a further embodiment, the spatial relationship and the location are based on a most recent touch input, a history or pattern of several touch inputs, a location most recently touched by the thumb 108, or the like. The location module 204, in another embodiment, detects the spatial relationship using a proximity sensor, an accelerometer, or another type of sensor.

In one embodiment, the location is within the reaching distance 122 of the thumb 108 to facilitate one handed operation by a user. The location, in one embodiment, is on a touch sensitive area of the screen 104. In a further embodiment, the location is on a touch sensitive area along a bezel of the screen 104, along an edge of the touch device 102, adjacent to the screen 104, on a secondary screen, on a back side of the touch device 102, or elsewhere on the touch device 102.

In one embodiment, the placement module 206 places the virtual touchpad 114 at a dynamic location within a touch sensitive area of the touch device 102. In a further embodiment, the location module 204 selects the dynamic location based on the spatial relationship between a user and the touch device 102. The placement module 206, in one embodiment, places the virtual touchpad 114 such that the virtual touchpad 114 defines a touchpad area at the location. The touchpad area is an area of the virtual touchpad 114 for which the system 100 processes touch input as touchpad input.

In one embodiment, the placement module 206 visually displays the virtual touchpad 114 at the location. For example, in one embodiment, the placement module 206 may display an outline, a colored or shaded shape, a scaled visualization of the screen 104, or another visual indicator representing the virtual touchpad 114 such that the touchpad area of the virtual touchpad 114 is visually apparent to a user.

In one embodiment, the touch input module 208 processes touch input from a user within the touchpad area of the virtual touchpad 114 as touchpad input, positioning the pointer 112 on the screen 104 in response to the touch input. The touch input module 208, in one embodiment, processes the touch input to provide an input interface for the touch device 102. The touch input module 208, in one embodiment, may scale touch movement within the touchpad area of the virtual touchpad 114 to move the pointer 112 around the screen 104 or a portion of the screen 104, allowing the user to interact with the one or more graphical elements 110 using the virtual touchpad 114. In a further embodiment, the touchpad area of the virtual touchpad 114 may receive touch input for a portion of the screen 104, and a user may change or move the portion of the screen 104 by touching an edge of the virtual touchpad 114 or the like. In another embodiment, the touch input module 208 may vary the amount of scaling or amplification based on a movement speed of the touch input, based on user preferences, or based on other factors. Scaling and amplification of the touch input that the touch input module 208 receives are described in greater detail in regard to the gain module 302 of FIG. 3.

In one embodiment, the close module 210 removes the virtual touchpad 114 from the location in response to a close event. The close event, in one embodiment, may include a timeout period passing, input from a user, or the like. For example, the close module 210, in one embodiment, may remove the virtual touchpad 114 in response to a timeout period passing without user input, in response to a user touching a close indicator such as an "x," in response to a predefined touch gesture, or in response to another close event. In one embodiment, the predefined touch gesture to close the virtual touchpad 114 is the same touch gesture that indicates a virtual touchpad request.

The close module 210, in one embodiment, removes the virtual touchpad 114 from the location by collapsing the virtual touchpad 114 to a periphery of the screen 104 or the like. In a further embodiment, the close module 210 may display a closed touchpad indicator, such as a bar, an icon, or another indicator along a periphery area of the screen 104 to indicate to a user that the virtual touchpad 114 is collapsed to the periphery. Similarly, the virtual touchpad request that the initiation module 202 receives, in one embodiment, may include a dragging gesture from a periphery area of the screen 104. For example, in one embodiment, a user may drag the closed touchpad indicator from the periphery area of the screen 104 as a virtual touchpad request.

Figure 3:
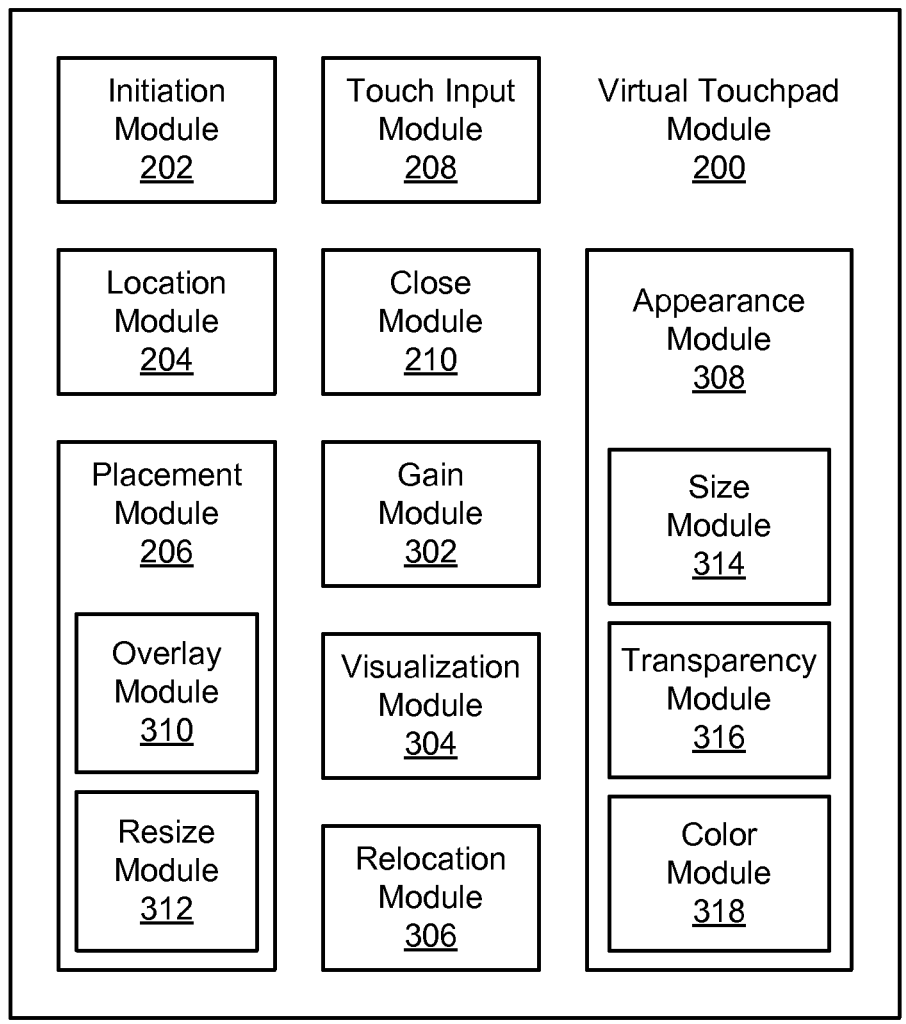
FIG. 3 is a schematic block diagram illustrating another embodiment of a virtual touchpad module.

FIG. 3 depicts another embodiment of the virtual touchpad module 200. In the depicted embodiment, the virtual touchpad module 200 includes the initiation module 202, the location module 204, the placement module 206, the touch input module 208, and the close module 210 and further includes a gain module 302, a visualization module 304, a relocation module 306, and an appearance module 308.

In the depicted embodiment, the placement module 206 includes an overlay module 310 and a resize module 312. The placement module 206, in one embodiment, places the virtual touchpad 114 at the dynamic location using the overlay module 310 and/or the resize module 312. In one embodiment, the placement module 206 selects one of the overlay module 310 and the resize module 312 based on input from a user. In a further embodiment, the placement module 206 toggles or alternates between use of the overlay module 310 and the resize module 312.

In one embodiment, the overlay module 310 places the virtual touchpad 114 at the location by overlaying the virtual touchpad 114 over a currently displayed area of the screen 104. The overlay module 310, in one embodiment, may overlay the virtual touchpad 114 transparently, such that the currently displayed area of the screen 104 is at least partially viewable through the virtual touchpad 114. In a further embodiment, the overlay module 310 may overlay the virtual touchpad 114 opaquely such that the currently displayed area of the screen 104 is not viewable through the virtual touchpad 114.

In one embodiment, the resize module 312 places the virtual touchpad 114 at the location by resizing a display area of the screen 104 away from the location of the virtual touchpad 114. The display area and the touchpad area, in one embodiment, are separate from each other allowing a user to view both the display area and the touchpad area simultaneously. The resize module 312, in one embodiment, resizes the display area of the screen 104 by shrinking the display area, changing the aspect ratio of the display area to create a space for the virtual touchpad 114 adjacent to the display area.

In one embodiment, the gain module 302 scales or amplifies the touch input from the user. In a further embodiment, the gain module 302 scales or amplifies the touch input based on a size ratio between the virtual touchpad 114 and at least a portion of the screen 104. The virtual touchpad 114, in one embodiment, includes a subset of a touch sensitive area of the touch device 102, and the gain module 302 scales the touch input from the virtual touchpad to the entire touch sensitive area and/or to the screen 104. The amount of scaling or amplification, in one embodiment, is based on input from a user, such as a user selectable preference, setting, or the like. In one embodiment, the portion of the screen 104 for which the virtual touchpad 114 receives input is dynamic, and changes based on user input, such as the user touching an edge of the virtual touchpad 114 or the like.

In one embodiment, the visualization module 304 displays a scaled copy or visualization of at least a portion of the screen 104 in the touchpad area of the virtual touchpad 114. The portion of the screen that the visualization module 304 displays, in one embodiment, corresponds to an area for which the virtual touchpad 114 receives input. As described above, the portion of the screen 104 may include the entire screen 104 or less than the entire screen 104, and may be dynamic, changing based on user input.

In one embodiment, the portion of the screen 104 that the visualization module 304 displays is variable and changes based on the area of the screen 104 for which the virtual touchpad 114 receives input. For example, as a user touches or approaches an edge of the virtual touchpad 114, in one embodiment, the scaled visualization may pan in the direction of the edge as the area of the screen 104 that virtual touchpad 114 receives input for also moves in the direction of the edge. In one embodiment, the visualization module 304 dynamically animates or updates the scaled copy to for consistency with the portion of the screen 104. As described above, the scaled copy or visualization may include the one or more scaled graphical elements 116, the scaled pointer 118, and/or other elements that the screen 104 displays.

In one embodiment, the relocation module 306 moves the location of the virtual touchpad 114 relative to the touch device 102. The relocation module 306, in one embodiment, moves the location for the virtual touchpad 114 dynamically. The relocation module 306, in one embodiment, dynamically moves the location of the virtual touchpad 114 in response to input from a user, a change in orientation of the touch device 102, a detected change in the spatial relationship between the touch device 102 and a user, or another event.

For example, in various embodiments, the relocation module 306 may move the virtual touchpad 114 in response to an area of touch input from a user changing, a user rotating the touch device 102, a user performing a touch gesture associated with a virtual touchpad request at a different location, or the like. By dynamically changing the location of the virtual touchpad 114, the relocation module 306 places the virtual touchpad 114 at a convenient location for a user even if the user changes the orientation or position of the touch device 102.

In one embodiment, the appearance module 308 determines the visual appearance of the virtual touchpad 114 based on stored preferences of a user. The appearance module 308, in one embodiment, allows a user to customize the visual appearance of the virtual touchpad 114 by providing user selectable settings and storing indicated preferences received from a user. In a further embodiment, the appearance module 308 stores one or more default preferences or visual profiles that are selectable by a user. In the depicted embodiment, the appearance module 308 includes a size module 314, a transparency module 316, and a color module 318.

The size module 314, in one embodiment, determines a size of the virtual touchpad 114 based on a stored preference of a user. The size module 314, in a further embodiment, may determine other size related visual aspects of the virtual touchpad 114, such as a shape, an aspect ratio, and the like. In another embodiment, the size module 314 determines the size of the virtual touchpad 114 automatically based on the reaching distance 122 of the thumb 108, which the size module 314 may determine based on previous touch input from the thumb 108.

The transparency module 316, in one embodiment, determines a visual transparency of the virtual touchpad 114 based on a stored preference of a user. In a further embodiment, the transparency module 316 allows a user to select the visual transparency from a scale between completely transparent and completely opaque. By providing the virtual touchpad 114 with some transparency, in one embodiment, the transparency module 316 allows a user to view and interact with the one or more graphical elements 110, the pointer 112, a background image, and/or other displayed elements on the screen 104 should the placement module 206 place the virtual touchpad 114 over them.

The color module 318, in one embodiment, determines a color of the virtual touchpad 114 based on a stored preference of a user. The color module 318, in a further embodiment, may determine a plurality of colors for the virtual touchpad 114, such as a border color, a fill color, and the like. In one embodiment, the appearance module 308 allows a user to select whether or not the visualization module 304 displays a scaled visualization of the screen 104 on the virtual touchpad 114.

In one embodiment, each module comprises a computer readable storage medium storing computer usable program code executable on a computer device, such as the touch device 102, to perform the described operations. The modules described above, in various embodiments, may be integrated with a software layer between hardware of the touch device 102 and an operating system of the touch device 102, such that the virtual touchpad 114 acts as a virtual input device for the touch device 102. For example, in one embodiment, the modules may be part of an operating system of the touch device 102, part of a device driver for the touch device 102, a plugin for the touch device 102, part of firmware for the touch device 102, or the like.

Figure 4A:
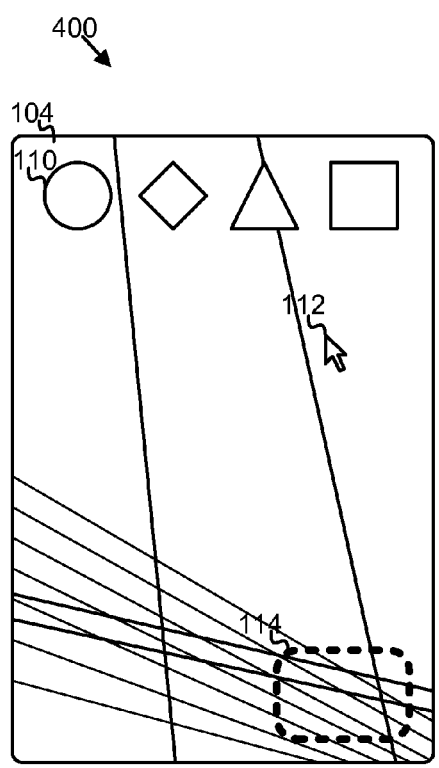
FIG. 4A is a schematic block diagram illustrating one embodiment of a virtual touchpad for a touch device.

FIG. 4A depicts one embodiment 400 of the virtual touchpad 114 on the screen 104. In the depicted embodiment 400, the placement module 206 uses the overlay module 310 to overlay the virtual touchpad 114 over a currently displayed area of the screen 104. In the depicted embodiment 400, a background image on the screen 104 is visible through the virtual touchpad 114. In a further embodiment, the virtual touchpad 114 may not be transparent, and the background image on the screen 104 may not be visible through the virtual touchpad 114.

Figure 4B:
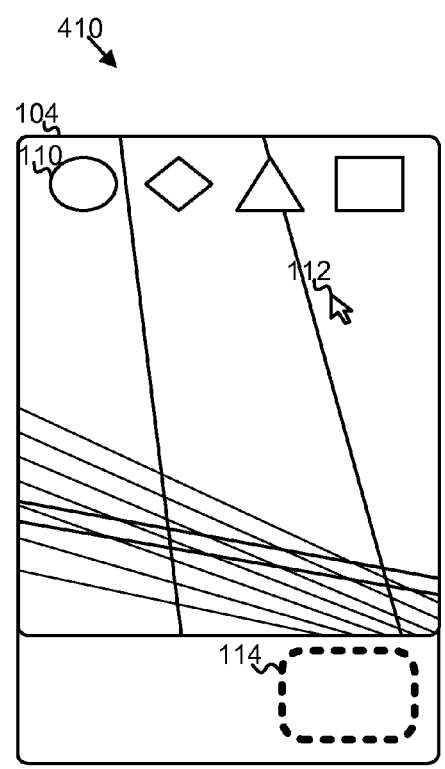
FIG. 4B is a schematic block diagram illustrating another embodiment of a virtual touchpad for a touch device.

FIG. 4B depicts another embodiment 410 of the virtual touchpad 114 on the screen 104. In the depicted embodiment 410, the placement module 206 uses the resize module 312 to resize a display area of the screen 104 away from the location of the virtual touchpad 114. In the depicted embodiment 410, the display area and the area of the virtual touchpad 114 are separate and do not overlap. The resize module 312, in the depicted embodiment 410, shrinks the display area of the screen 104 vertically, creating room for the virtual touchpad 114 below the display area. In a further embodiment, the resize module 312 may shrink the display area of the screen 104 vertically, horizontally, diagonally to maintain an aspect ratio of the display area, or in another manner to create room for the virtual touchpad 114 adjacent to the display area. The resize module 312, in one embodiment, may select a direction to shrink the display area based on an orientation of the touch device 102, the spatial relationship between the user and the touch device 102, a user preference, or the like.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
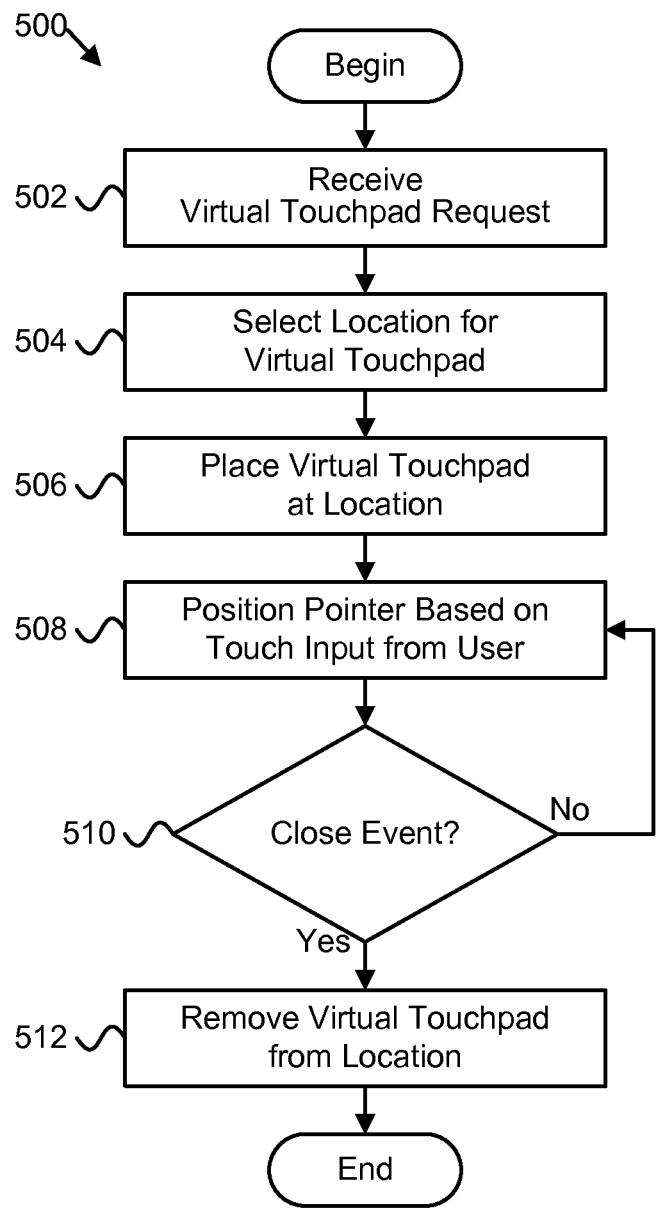
FIG. 5 is a schematic flow chart diagram illustrating one embodiment of a method for providing a virtual touchpad for a touch device.

FIG. 5 depicts one embodiment of a method 500 for providing a virtual touchpad 114 for a touch device 102. The method 500 substantially includes the steps to carry out the functions presented above with respect to the operation of the described apparatus and system of FIGS. 1, 2, and 3. In one embodiment, the method 500 is implemented with a computer readable storage medium storing computer usable program code on a tangible storage device. The computer readable storage medium may be integrated into a computing system, such as the touch device 102, wherein the computer readable program executed by the computing system performs the method 500.

In the depicted embodiment, the method 500 begins, and the initiation module 202 receives 502 a virtual touchpad request from a user requesting use of the virtual touchpad 114 as an input interface for the touch device 102. The location module 204 selects 504 a dynamic location for the virtual touchpad 114 within a touch sensitive area of the touch device 102. In one embodiment, the location module 204 selects 504 the dynamic location for the virtual touchpad 114 based on a detected spatial relationship between the touch device 102 and a user. The placement module 206 places 506 the virtual touchpad 114 at the location within the touch sensitive area of the touch device. The placement module 206, in one embodiment, may place 506 the virtual touchpad 114 at the location using the overlay module 310 or the resize module 312, may toggle between using the overlay module 310 and the resize module 312, or the like.

The touch input module 208 positions 508 the pointer 112 on the screen 104 in response to a touch input from a user on the virtual touchpad 114. The close module 210 determines 510 whether a close event has occurred, such as a timeout period passing, receiving a close input from a user, or the like. If the close module 210 determines 510 that a close event has not occurred, the touch input module 208 continues to process touch input from the user on the virtual touchpad 114 by positioning 508 the pointer 112 on the screen 104. If the close module 210 determines 510 that a close event has occurred, the close module 210 removes 512 the virtual touchpad 114 from the location and the method 500 ends.

Figure 6:
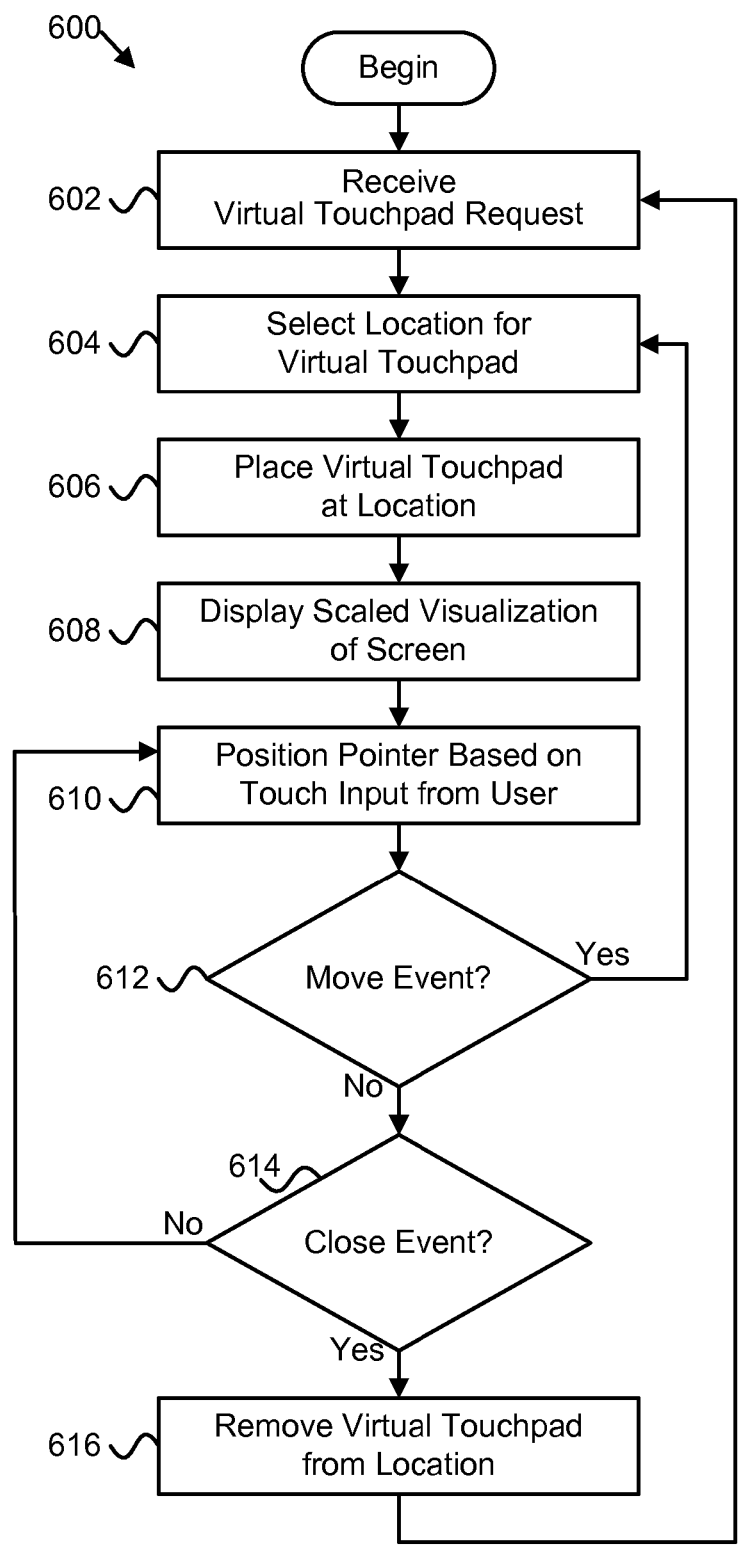
FIG. 6 is a schematic flow chart diagram illustrating another embodiment of a method for providing a virtual touchpad for a touch device.

FIG. 6 depicts another embodiment of a method 600 for providing a virtual touchpad 114 for a touch device 102. The method 600 substantially includes the steps to carry out the functions presented above with respect to the operation of the described apparatus and system of FIGS. 1, 2, and 3. In one embodiment, the method 600 is implemented with a computer readable storage medium storing computer usable program code on a tangible storage device. The computer readable storage medium may be integrated into a computing system, such as the touch device 102, wherein the computer readable program executed by the computing system performs the method 600.

In the depicted embodiment, the method 600 begins, and the initiation module 202 receives 602 a virtual touchpad request from a user requesting use of the virtual touchpad 114 as an input interface for the touch device 102. The location module 204 selects 604 a location for the virtual touchpad 114 relative to the touch device 102 based on a detected spatial relationship between the touch device 102 and a user. The placement module 206 places 606 the virtual touchpad 114 at the location. The visualization module 304 displays 608 a scaled visualization of at least a portion of the screen 104 on the virtual touchpad 114.

The touch input module 208 positions 610 the pointer 112 on the screen 104 in response to a touch input from a user on the virtual touchpad 114. The relocation module 306 determines 612 whether a move event has occurred, such as a detected change in the spatial relationship between the touch device 102, receiving a move input from a user, a change in orientation of the touch device 102, or the like. If the relocation module 306 determines 612 that a move event has occurred, the method 600 returns to the location selection step 604, and the location module 204 selects 604 a new location for the virtual touchpad 114.

If the relocation module 306 determines 612 that a move event has not occurred, the close module 210 determines 614 whether a close event has occurred, such as a timeout period passing, receiving a close input from a user, or the like. If the close module 210 determines 614 that a close event has not occurred, the touch input module 208 continues to process touch input from the user on the virtual touchpad 114 by positioning 610 the pointer 112 on the screen 104. If the close module 210 determines 614 that a close event has occurred, the close module 210 removes 616 the virtual touchpad 114 from the location until the initiation module 202 receives 602 a new virtual touchpad request from a user and the method 600 continues.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
overlay, in response to a predefined singular touch input at a first location on the touch-sensitive screen, a virtual touchpad at a dynamic location within the touch-sensitive screen, wherein overlaying the virtual touchpad comprises displaying the virtual touchpad over a currently displayed area of the touch-sensitive screen;
detect a spatial relationship between a user and the touch device;
select the dynamic location based on the spatial relationship, wherein
the spatial relationship comprises a location of the most recent touch input of the user's thumb on the touch-sensitive screen; and
the dynamic location comprises a location within the touch sensitive area on the front side of the touch device away from the location of the most recent touch input of the user's thumb on the touch-sensitive screen;
display a scaled copy of the touch-sensitive screen on the virtual touchpad, wherein the touch-sensitive screen displays one or more graphical elements and the scaled copy of the touch-sensitive screen includes a scaled copy of each graphical element displayed on the touch-sensitive screen, the scaled copy of each graphical element being displayed at a location within the virtual touchpad corresponding to its location within the touch-sensitive screen;
move the virtual touchpad to the second location within the touch-sensitive screen in response to a subsequent predefined singular touch input at a second location outside of the virtual touchpad and different from the first location;
position a pointer on the touch-sensitive screen in response to a touch input on the virtual touchpad;
displays a scaled copy of the pointer within the virtual touchpad; and
remove the virtual touchpad from the location in response to a period of inactivity within the virtual touchpad.

2. The apparatus of claim 1, wherein the processor further scales movement of the pointer relative to the touch input on the virtual touchpad based on a size ratio between the virtual touchpad and at least a portion of the screen of the touch device, the virtual touchpad comprising a subset of the touch sensitive area of the touch device.

3. The apparatus of claim 1, wherein the currently displayed area of the touch-sensitive screen located under the virtual touchpad is partially viewable through the virtual touchpad and wherein a user may interact with the entire screen through the scaled copy on the virtual touchpad.

4. The apparatus of claim 1, wherein the spatial relationship further comprises an orientation of the touch device.

5. The apparatus of claim 1, wherein the touch device comprises a slate-sized touch device capable of being held in a single hand of a user and receiving touch input from a thumb of the single hand of the user, the touch-sensitive screen having a size that is larger than a reaching distance of the thumb, the processor placing the virtual touchpad within the reaching distance of the thumb.

6. The apparatus of claim 1, wherein the processor further displays a closed touchpad indicator along a periphery area of the front screen in response to removing the virtual touchpad.

7. A method comprising:
overlaying a virtual touchpad, in response to a predefined singular touch input at a first location on a front screen of a touch device, at a dynamic location within a touch sensitive area on the front screen of the touch device, wherein overlaying the virtual touchpad comprises displaying the virtual touchpad over a currently displayed area of the touch sensitive area of the front screen, the touch sensitive area of the front screen receiving touch input and displaying visual images;
detecting a spatial relationship between a user and the touch device;
selecting the dynamic location based on the spatial relationship, wherein
the spatial relationship comprises a location of the most recent touch input of the user's thumb on the front screen; and
the dynamic location comprises a location within the touch sensitive area on the front side of the touch device away from the location of the most recent touch input of the user's thumb on the front screen;
displaying a scaled copy of the front screen on the virtual touchpad, wherein the front screen displays one or more graphical elements and the scaled copy of the front screen includes a scaled copy of each graphical element displayed on the front screen, the scaled copy of each graphical element being displayed at a location within the virtual touchpad corresponding to its location within the front screen;
moving the virtual touchpad, in response to a subsequent predefined singular touch input at a second location outside of the virtual touchpad and different from the first location, to the second location within the touch sensitive area;
positioning a pointer on a screen of the touch device in response to a touch input on the virtual touchpad;
displaying a scaled copy of the pointer within the virtual touchpad; and
removing the virtual touchpad from the location in response to a period of inactivity within the virtual touchpad.

8. The method of claim 7, further comprising scaling movement of the pointer relative to the touch input on the virtual touchpad based on a size ratio between the virtual touchpad and at least a portion of the screen of the touch device, the virtual touchpad comprising a subset of the touch sensitive area of the touch device.

9. The method of claim 7, further comprising displaying a closed touchpad indicator along a periphery area of the front screen in response to removing the virtual touchpad.

10. The method of claim 7, wherein the currently displayed area of the touch sensitive area of the front screen located under the virtual touchpad is partially viewable through the virtual touchpad, the virtual touchpad allowing a user to interact with the entire front screen through the scaled copy on the virtual touchpad.

11. The method of claim 7, wherein the spatial relationship further comprises an orientation of the touch device.

12. The method of claim 7, wherein the touch device comprises a slate-sized touch device capable of being held in a single hand of a user and receiving touch input from a thumb of the single hand of the user, the touch sensitive area having a size that is larger than a reaching distance of the thumb, wherein placing the virtual touchpad comprises placing the virtual touchpad within the reaching distance of the thumb.

13. A computer program product comprising a non-transitory computer readable storage medium storing computer usable program code executable on a computer to perform operations, the operations comprising:
overlaying a virtual touchpad, in response to a predefined singular touch input at a first location on a front screen of a touch device, at a dynamic location within a touch sensitive area on the front screen of the touch device wherein overlaying the virtual touchpad comprises displaying the virtual touchpad over a currently displayed area of the touch sensitive area of the front screen, the touch sensitive area of the front screen receiving touch input and displaying visual images:
detecting a spatial relationship between a user and the touch device,
selecting the dynamic location based on the spatial relationship, wherein
the spatial relationship comprises a location of the most recent touch input of the user's thumb on the front screen; and the dynamic location comprises a location within the touch sensitive area on the front side of the touch device away from the location of the most recent touch input of the user's thumb on the front screen;
displaying a scaled copy of the front screen on the virtual touchpad, wherein the front screen displays one or more graphical elements and the scaled copy of the front screen includes a scaled copy of each graphical element displayed on the front screen, the scaled copy of each graphical element being displayed at a location within the virtual touchpad corresponding to its location within the front screen:
moving the virtual touchpad, in response to a subsequent predefined singular touch input at a second location outside of the virtual touchpad and different from the first location, to the second location within the touch sensitive area; positioning a pointer on a screen of the touch device in response to a touch input on the virtual touchpad;
scaling movement of the pointer relative to the touch input on the virtual touchpad based on a size ratio between the virtual touchpad and at least a portion of the screen of the touch device, the virtual touchpad comprising a subset of the touch sensitive area of the touch device; displaying a scaled copy of the pointer within the virtual touchpad; and removing the virtual touchpad from the location in response to a period of inactivity within the virtual touchpad; and
displaying a closed touchpad indicator along a periphery area of the front screen in response to removing the virtual touchpad, wherein the touch device comprises a slate-sized touch device capable of being held in a single hand of a user and receiving touch input from a thumb of the single hand of the user, the touch sensitive area having a size that is larger than a reaching distance of the thumb, wherein placing the virtual touchpad comprises placing the virtual touchpad within the reaching distance of the thumb.

14. The computer program product of claim 13, wherein the currently displayed area of the touch sensitive area of the front screen located under the virtual touchpad is partially viewable through the virtual touchpad, the virtual touchpad allowing a user to interact with the entire front screen through the scaled copy on the virtual touchpad.

* * * * *